United States Patent [19]

Hinkley et al.

[11] Patent Number: 4,613,960
[45] Date of Patent: Sep. 23, 1986

[54] METHOD FOR CONSTRUCTING AND USING AN OPTIMAL PILOT TRACE IN SURFACE CONSISTENT STATICS ESTIMATIONS

[75] Inventors: David Hinkley, Dallas; Keh Pann, Richardson, both of Tex.

[73] Assignee: Mobil Oil Corporation, New York, N.Y.

[21] Appl. No.: 530,322

[22] Filed: Sep. 8, 1983

[51] Int. Cl.[4] ............................................. G01V 1/36
[52] U.S. Cl. ........................................ 367/51; 367/40; 367/50
[58] Field of Search ....................... 367/38, 40, 41, 42, 367/59, 63, 73, 50, 51; 364/421

[56] References Cited

U.S. PATENT DOCUMENTS 4,206,509 6/1980 Ruehle ................................... 367/50

OTHER PUBLICATIONS

Wiggens et al., "Residual Statics Analysis as a General Linear Inverse Problem" Geophysics, vol. 41, No. 5, Oct. 1976, pp. 922-938.
Taner et al., "Estimation and Correction of Near-Surface Time Anomalies", Geophysics, vol. 39, No. 4, Aug. 1974, pp. 441-463.

Primary Examiner—Salvatore Cangialosi
Assistant Examiner—Ian J. Lobo
Attorney, Agent, or Firm—Alexander J. McKillop; Michael G. Gilman; Charles J. Speciale

[57] ABSTRACT

Disclosed is a method for constructing an optimal pilot trace from a gather of seismic traces, which pilot trace can be used to obtain statics estimates for time correction of the gathered traces prior to common depth point stacking. During construction of the optimal pilot trace, the statics estimates are inherently obtained.

8 Claims, 3 Drawing Figures

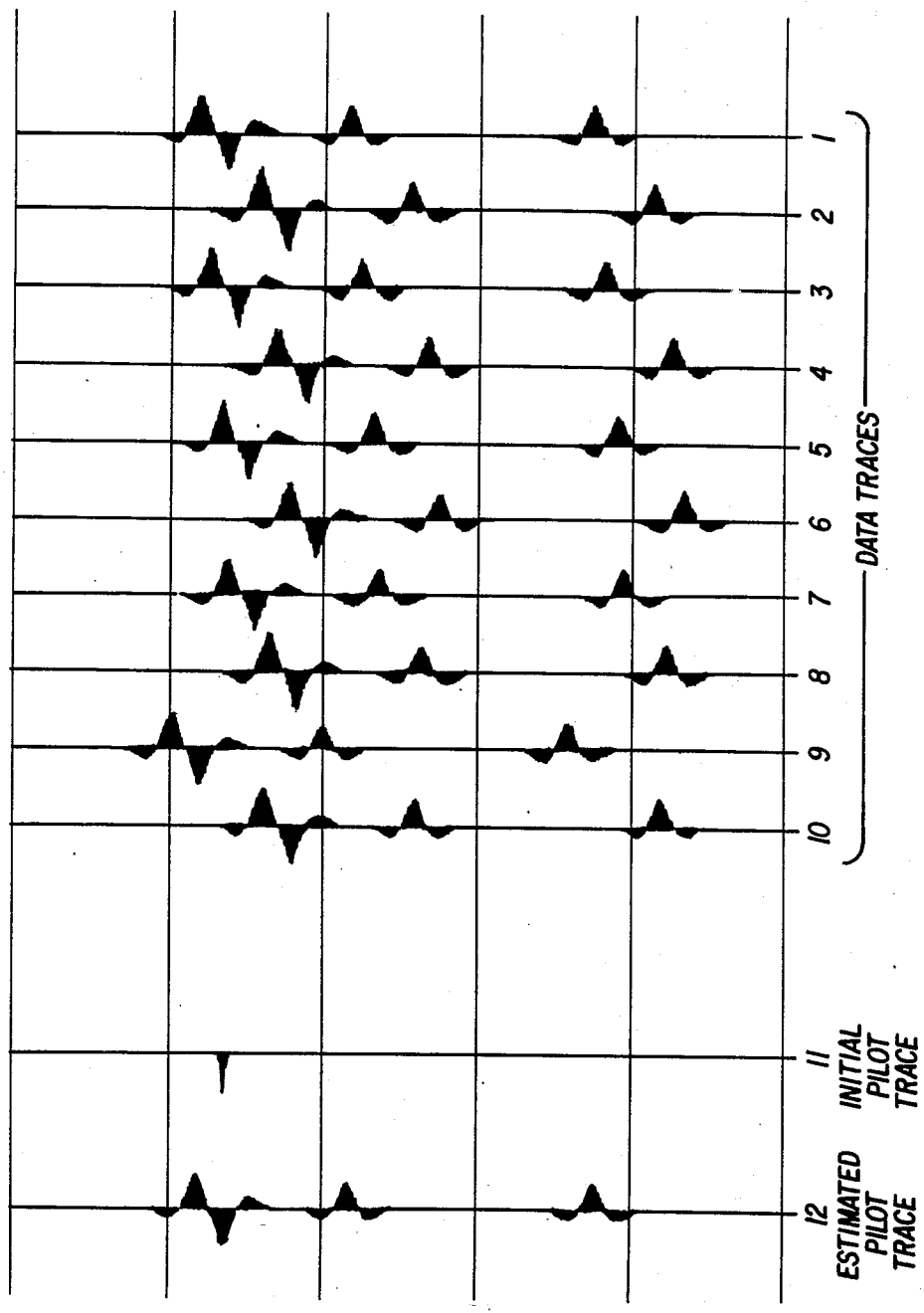

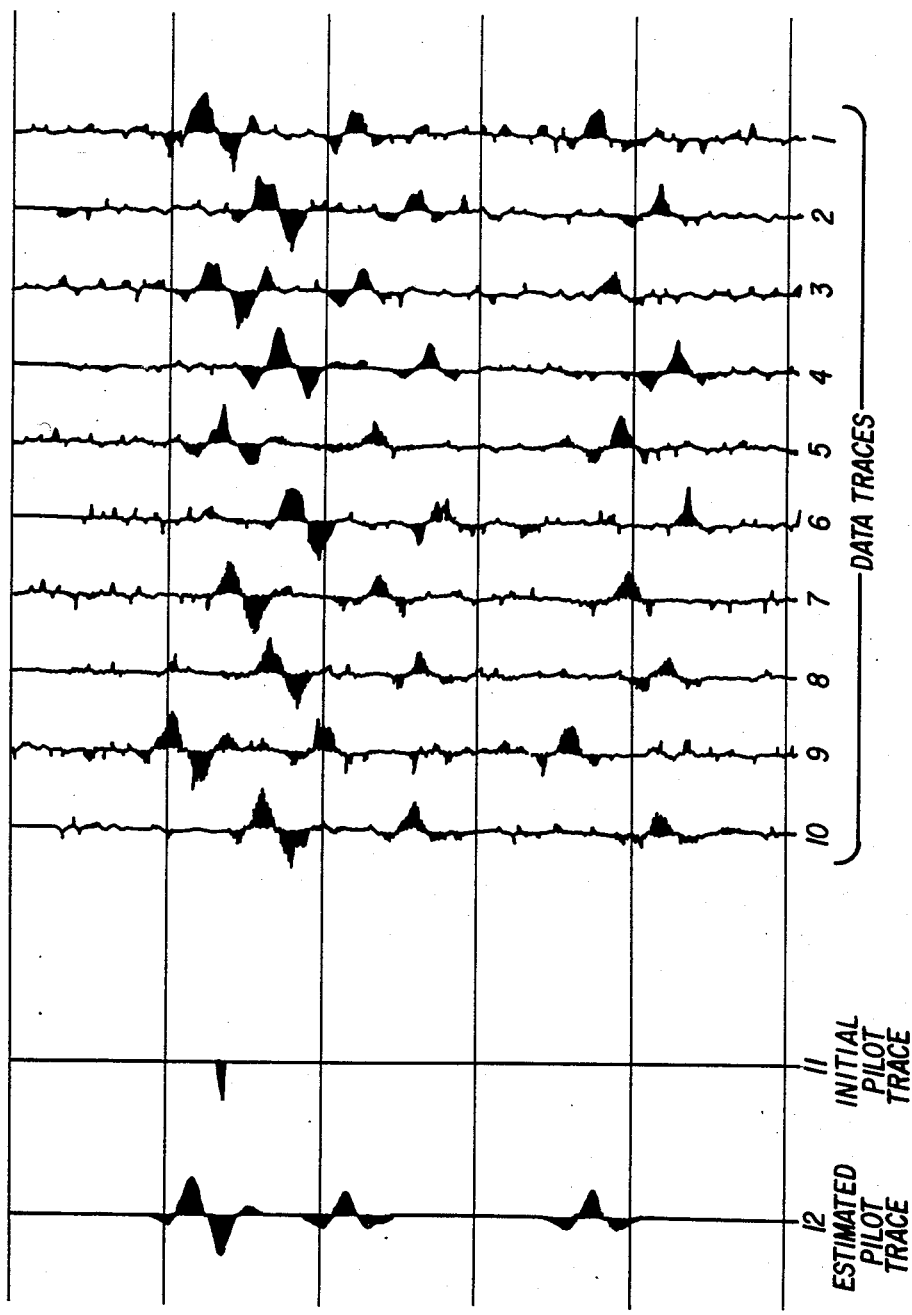
FIG. 3 SAME SYNTHETIC DATA WITH WHITE GAUSSIAN NOISE, SIGNAL AMPLITUDE = 1, NOISE RMS AMPLITUDE = .25

METHOD FOR CONSTRUCTING AND USING AN OPTIMAL PILOT TRACE IN SURFACE CONSISTENT STATICS ESTIMATIONS

BACKGROUND OF THE INVENTION

1. Field of the Invention

The present invention relates to a method for making surface consistent statics estimations from seismic traces using a constructed optimal pilot trace with which the seismic may be cross-correlated.

2. Discussion of the Prior Art

Surface consistent statics estimations from seismic data traces are typically determined and used to time shift signal traces to properly align the traces in time for common depth point (CDP) trace stacking. Commonly, a pilot trace is generated which is cross-correlated with a gather of traces to determine time shifts between the gathered traces and pilot trace which are then utilized to properly time position the traces for subsequent common depth point stacking. The pilot trace is a key element is ensuring accurate statics estimations.

In an ideal case, where there is little noise, one of the seismic data traces can be used as the pilot trace. However, in practice, the presence of noise often makes this impractical. Accordingly, an accurate pilot trace is usually simulated and then used in a statics estimation procedure. Typically, the pilot trace is simulated from a set of numerical computational procedures which do not ensure that the best of pilot trace is generated. A pilot trace optimized to the characteristics of the gathered signal traces would produce better cross-correlated results and thus better statics estimations.

SUMMARY OF THE INVENTION

The present invention is directed to a method for determining surface consistent statics which uses a constructed, optimal pilot trace to improve the accuracy of the estimates. The optimal pilot trace for a given gather of seismic traces is constructed from a vector interpretation of the gathered traces and is defined as a trace which is the "best fit," i.e., the closest in vector distance, to all of the traces of a gather which are optimally scaled and shifted during statics estimations using the pilot trace.

Accordingly, one object of the invention is the provision of an improved method for making surface consistent statics estimates using an optimal pilot trace constructed from the characteristics of the gathered traces for which statics estimations are to be made.

Another object of the invention is the provision of an improved method for generating an optimal pilot trace which can be used in surface consistent statics estimates.

A principal feature of the method of the invention is the construction of an optimal pilot trace which can be cross-correlated with the individual traces of a gather to determine relative time shifts of the traces for use in surface consistent statics estimations. In the invention, the pilot trace is constructed as an optimal or "best fit" trace from the traces of a gather with which it will be correlated. In addition, as the optimal pilot trace is determined, the method of the invention also inherently provides the time shifts between the pilot trace and the individual traces of a gather, that is, the statics estimations normally determined by cross-correlating a pilot trace with the individual gathered traces. The invention also inherently provides proper amplitude scalar factors for the gathered traces as the pilot trace is determined, which can be used for surface consistent amplitude and phase shift estimates.

These and other object features and advantages of the method of the invention will be more clearly seen from the following detailed description of the invention which is provided in connection with the accompanying drawings.

BRIEF DESCRIPTION OF THE DRAWINGS

FIG. 2 illustrates the application of the method of the invention to ten simulated noiseless data traces; and, FIG. 3 illustrates application of the method of the invention to ten simulated noisy data traces.

DETAILED DESCRIPTION OF THE INVENTION

Figure 1:
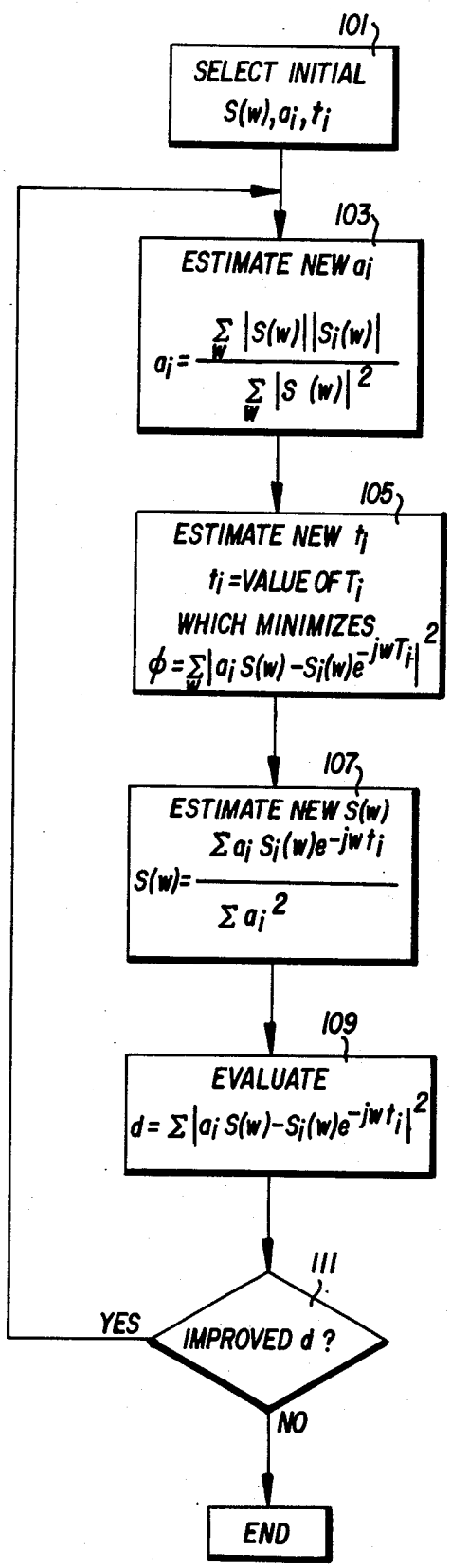
FIG. 1 illustrates a flowchart detailing the principle steps employed in the method of the invention.

In the method of the invention an optimal pilot trace is determined to be a trace which minimizes the sum of $L_2$ distances (also called the Euclidean distances) between it and a gather of input traces, which can have all possible time shifts and scale factors. This is geometrical vector interpretation of the gathered input traces. The optimal pilot trace will have an optimum waveform $S(t)$, and an optimal time shift $t_i$ and scale factor $a_i$ will be associated with each of the gathered traces in producing the optimal pilot trace. Thus, the pilot trace is defined to be a constructed trace which is closest in the $L_2$ distance sense to all the gathered input traces which are optimally amplitude scaled and time shifted. The following discussion illustrates this point in greater detail.

If $S_i(t)$, $i=1 \ldots N$ represents a gather of N traces and $S(t)$ represent an optimal pilot trace to be determined and $a_i$, $t_i$ where $i=1 \ldots N$, are the optimal scale factors and time shifts associated with each of the gathered traces gathered, then the $L_2$ distance between a scaled pilot trace $a_iS(t)$ and a time shifted trace $S_i(t-t_i)$ is defined as:

$$d_i = \int (a_i S(t) - S_i(t-t_i))^2 dt \qquad (1)$$

where the limits of integration cover a time window, e.g., 500 ms, of a portion of the traces. For an optimal pilot trace constructed in accordance with the invention, the sum of the $L_2$ distances (the so-called Euclidean distances) over all traces in a gather, namely, $$d = \sum_{i=1}^{N} d_i \qquad (2)$$

$$d = \sum_{i=1}^{N} \int (a_i S(t) - S_i(t - t_i))^2 dt \qquad (3)$$

is to be minimized with respect to the unknowns $S(t)$, $a_i$, and $t_i$ for $i=1 \ldots N$. In an ideal noiseless case d can equal zero; however, in general $d \geq 0$ because the integrated of $d_i \geq o$ for each i. To ensure a unique solution, the following constraints are further employed:

$$\int S(t)^2 dt = 1 \qquad (4)$$

and $$\sum_{i=1}^{N} t_i = 0 \qquad (5)$$

Equation 4 normalizes the energy of the pilot trace while equation 5 fixes an otherwise arbitrary time shift for the pilot trace. Equation 3 which is to be minimized in constructing an optimal pilot trace can be conveniently rewritten in the frequency domain as follows:

$$d = \sum_{i=1}^{N} \int (a_i S(w) - S_i(w)e^{-jwt_i})^2 dw \qquad (6)$$

where $S(w)$, $S_i(w)$ are the Fourier transforms of $S(t)$ and $S_i(t)$ respectively and the integration is conducted over a frequency band of interest in the positive half of the frequency axis.

Equation 6 represents a quadratic objective function which is to be minimized and which, when minimized, yields the optimum pilot trace $S(w)$ appropriately scaled by $a_i$ and time shifted relative to a gathered trace by $t_i$. There is a unique scale factor $a_i$ and time shift $t_i$ for each trace of the gather.

While a number of different procedures can be used to minimize equation 6, the procedure illustrated in the FIG. 1 flowchart is preferably employed in the invention as it can easily be implemented by means of a digital computer. As readily seen from equation 6 there are three variables to be determined in the objective function, namely, $S(w)$, and appropriate scale factors and time shifts $a_i$ and $t_i$ for each of the gathered traces.

The first step 101 of the procedure involves taking the Fourier transform of a selected or constructed initial pilot trace to produce the pilot trace signal $S(w)$, and further selecting initial scale factors $a_i$ and an initial time shifts $t_i$ (where $i=1, 2 \ldots N$) for the gathered traces. The gathered traces $S_i(t)$ are also converted into the frequency domain as $S_i(w)$ in step 101. The initial pilot signal $S(w)$ may be selected using one of the conventional methods for generating pilot signals discussed above in the Background of the Invention. For example, it could be one of the gathered traces to be processed, or it may be formed by using conventional pilot signal construction techniques.

After the initial pilot trace is selected and transformed into the frequency domain and initial scale factors $a_i$ and time shifts $t_i$ are selected, new estimated scale factors $a_i (i=1 \ldots N)$ are then calculated in step 103 for each gathered trace using the relationship:

$$a_i = \sum_{w} \frac{S(w) S_i(w)}{\sum_{w} |S(w)|^2} \qquad (7)$$

Following this, in step 105 new estimated time shifts $t_i$ are calculated using the relationship:

$$\phi = \sum_{w} |a_i S(w) - S_i(w)e^{-jwT}|^2 \qquad (8)$$

where $\phi$ is minimized for all possible values of T. In this step T is varied stepwise from a predetermined lowest to a predetermined highest possible value, i.e., $Tmin \leq T \leq Tmax$, and for each value of T the quantity $\phi$ is calculated, with $t_i$ being determined by that value of T which yields the smallest value for $\phi$.

In the next step 107, a new pilot trace $S(w)$ is estimated using the relationship:

$$S(w) = \sum_{i} \frac{a_i S_i(w) e^{-jwt_i}}{\sum_{i} a_i^2} \qquad (9)$$

Next in step 109, the objective function defined above in equation 6 is evaluated to determine if the value d has improved (attained a lower value) as compared with previous passes through steps 103, 105 and 107. If not, the process returns to step 103 and the process of estimating new scaler factors $a_i$, time shifts $t_i$ and a pilot signal $S(w)$ is repeated until, in step 109, it is determined that the value d of the objective function stops improving, at which time the process is now completed. The estimated pilot trace $S(w)$, produced in the procedure illustrated in FIG. 1 can be used in statics estimation procedures.

However, one of the unique advantages of the optimizing process described above is that statics estimates are inherently produced as the pilot trace $S(w)$ is being optimized. This occurs in step 105 where the time shifts $t_i$ between an estimated pilot trace and each of the gathered traces $S_i(w)$ is determined. Once it is determined in step 111 that an optimum pilot trace has been found, the various time shifts $t_i$ between it and each of the gathered traces, determined in step 107, can then be used as the estimated source receiver statics for the various traces. In subsequent trace processing appropriate corrections for these statics can be applied to the gathered traces and the traces can then be common depth point gathered and stacked. The stacked traces can then be used in a conventional manner to produce seismograms representing subsurface formation characteristics.

FIG. 2 illustrates by way of experimental results how the invention can be applied to gathered data traces. In FIG. 2, ten (10) noiseless synthetic data traces (1 ... 10) were constructed from a Ricker wavelet and used to produce an optimum pilot trace in accordance with the teachings of the invention.

The initial selected pilot trace $S(t)$ is shown as trace 11. This initial trace is shown as having an impulse-like wave shape which is extremely dissimilar to the gathered traces 1 ... 10. Initial scalar values of $a_i = 1$, $t_i = 0$ were also selected. By using the method of the invention described above including the processing steps illustrated in FIG. 1, an estimated pilot trace 12 was produced after five iterations through steps 103 through 111. As evident from FIG. 2, the estimated pilot trace 12 conforms extremely well with the data traces in wave shape. Additional similar experimental results conducted with data traces containing varying amounts of noise also produced extremely good pilot trace estimates after only five iterations. For example, FIG. 3 illustrates the results of producing an estimated pilot trace from synthetic data traces containing white Gaussian noise, with the signal amplitude being 1 and the noise RMS amplitude being 0.25. As shown, the produced pilot trace 12 conforms very closely to the waveform shape of the data traces.

The optimal scale factor estimates $a_i$ which are produced using the processing steps carried out by the method of the invention can also be used for surface consistent amplitude estimates as well as for surface consistent phase shift estimates, if they are allowed to be complex numbers.

As evident from the above, the method of the invention is preferably implemented by a conventional general purpose digital computer, programmed, e.g., using conventional programming techniques, in accordance with the flowchart processing steps illustrated in FIG. 1.

While a preferred embodiment of the invention has been described and illustrated it should be apparent that many modifications can be made thereto without departing from the spirit and scope of the invention. Accordingly, the invention is not limited by the foregoing description, but is only limited by the scope of the claims appended hereto.

We claim:

1. A method for determining surface consistent statics estimates from gathered input seismic traces comprising the steps of:
   recording acoustic wave signals from a plurality of sources as seismic input traces at a plurality of receiver locations;
   gathering at least a portion of said recorded traces for source-receiver statics estimations;
   constructing an optimal pilot trace from said gathered traces for use in statics estimations by
   (a) selecting an initial pilot trace, and initial time shifts $t_i$ and scale factors $a_i$ associated with each of said gathered traces, where $i=1$ to the number of gathered traces;
   (b) estimating new scale factors $a_i$ where $$a_i = \frac{\sum_w |S(w)| |S_i(w)|}{\sum_w |S(w)|^2}$$

from said initial pilot trace and said gathered traces;
   (c) estimating new time shifts $t_i$ from said new scale factors $a_i$, initial pilot trace, and said gathered traces;
   (d) estimating a new pilot trace from said gathered traces, new estimated scale factors $a_i$ and new estimated time shifts $t_i$;
   (e) determining if said new estimated pilot trace is better than a previously estimated pilot trace in terms of minimizing the sum of Eucledian distances; and
   repeating steps (b), (c), (d) and (e) with the most recently estimated pilot trace, scale factors $a_i$ and time shifts $t_i$ as substitutes for the initial pilot trace, scale factors $a_i$ and time shifts $t_i$, respectively; said repetition occurring until the sum of Eucledian distances is minimized as determined in step (e);
   using said constructed pilot trace to obtain source-receiver statics estimates for each of said gathered traces;
   applying statics corrections to said gathered traces corresponding to said obtained source-received statics estimates;
   gathering said statics corrected traces in a common depth point gather; and
   stacking said common depth point gathered traces.

2. A method as in claim 1 further comprising the step of obtaining said statics estimations during construction of said optimal pilot trace.

3. A method as in claim 1 wherein the estimate of new time shifts in step (c) is performed by determining an estimated time shift value $t_i$ which equals the value of T which minimizes the following relationship:

$$\phi = \sum_w | a_i S(w) - S_i(w) e^{-jwT} |^2$$

where $a_i$ represents the most recently estimated scale factors, $S(w)$ represents the most recently estimated pilot trace, $S_i(w)$ represents the gathered traces and T is varied between a predetermined minimum and maximum value.

4. A method as in claim 1 wherein a new pilot trace is estimated in step (d) in accordance with the following relationship:

$$S(w) = \sum_i \frac{a_i S_i(w) e^{-jwt_i}}{\sum_i a_i^2}$$

where $S(w)$ represents the estimated new pilot trace, $a_i$ represents the most recently estimated scale factors, and $t_i$ represents the most recently estimated time shifts and $S_i(w)$ represents the gathered traces.

5. A method as in claim 1 wherein the determining step (e) is performed by determining whether the following relationship continues to be minimized for each newly estimated pilot trace:

$$d = \sum_{i=1}^{N} | a_i S(w) - S_i(w) e^{-jwt_i} |^2 dw$$

where $a_i$ represents the most recently estimated scale factors, $S(w)$ represents the most recently estimated pilot trace, $t_i$ represents the most recently estimated time shifts and $S_i(w)$ represents the gathered traces.

6. A method as in claim 1 further comprising the step of cross-correlating said constructed optimal pilot trace with said gathered traces to produce source-received statics estimates for each of said gathered traces.

7. A method as in claim 1 wherein said scale factors $a_i$ are complex numbers.

8. A method as in claim 1 further comprising the step of producing seismograms representing subsurface formation characteristics from said stacked traces.

* * * * *